United States Patent [19]
Shimura et al.

[11] 4,454,536
[45] Jun. 12, 1984

[54] METHOD AND APPARATUS FOR CORRECTING VIDEO SIGNALS IN COLOR PRINTING SIMULATION

[75] Inventors: Kisaburo Shimura, Urawa; Tetsuji Utsuda, Koshigaya; Hironobu Suda, Ohimachi; Koji Kobayashi, Higashiyamato, all of Japan

[73] Assignee: Toppan Printing Co., Ltd., Japan

[21] Appl. No.: 365,643

[22] Filed: Apr. 5, 1982

[30] Foreign Application Priority Data

Apr. 7, 1981 [JP] Japan ................................. 56-52221
Sep. 24, 1981 [JP] Japan ............................... 56-150876

[51] Int. Cl.³ ............................................. G03F 3/08
[52] U.S. Cl. ......................................... 358/76; 358/80
[58] Field of Search ................................. 358/76, 80

[56] References Cited
U.S. PATENT DOCUMENTS 3,972,066  7/1976  Seki et al. ............................ 358/76
4,250,522  2/1981  Seki et al. ............................ 358/76
4,349,835  9/1982  Horiguchi et al. .................... 358/80

Primary Examiner—John C. Martin
Assistant Examiner—Jeffrey D. Sutherland
Attorney, Agent, or Firm—Ostrolenk, Faber, Gerb & Soffen

[57] ABSTRACT

A method and an apparatus for correcting video signals are provided for printing simulation with a color monitor. Excellent mixed-color simulation can be performed in a printing process processing with a relatively high U.C.R.%. Mixed-color signals of secondary colors, a tertiary color, a quaternary color, black x primary colors, and black x secondary colors are detected from the signals (Y), (M), (C) and (K) for yellow Y, magenta M, cyan C and black K. The mixed-color signals are subjected to overlap compensation to provide overlap-compensated mixed-color signals. The signals (Y), (M), (C) and (K) are corrected using the overlap-compensated mixed-color signals so as to reduce color value of the mixed-colors in small portions. Printing simulation with a color monitor is facilitated. A correction/conversion method and an apparatus therefor are also provided which have a function of mixed-color correction and a function of converting the signals (Y), (M), (C) and (K) into signals (B), (G) and (R) for the color monitor.

8 Claims, 7 Drawing Figures

METHOD AND APPARATUS FOR CORRECTING VIDEO SIGNALS IN COLOR PRINTING SIMULATION

BACKGROUND OF THE INVENTION

The present invention relates to a method and an apparatus for correcting video signals in color printing simulation for determining or checking color separation conditions.

Color printing simulation apparatus of the type described above are quite convenient and are rapidly developing since proof-printing which requires much labor, time and cost can be eliminated or reduced.

One requirement of a printing simulation apparatus of this type is the optimal resemblance of the image on the color monitor to the printed image. In order to achieve such optimal resemblance, the present applicant proposed in Japanese Patent Application No. 5,625/1975 (Japanese Patent Publication No. 38,922/1979) a technique for better resemblance of particularly secondary and tertiary colors of the image on the color monitor to the printed image.

In general, a low under color removal (U.C.R.%) is adopted in Japan. With a low U.C.R.%, it is possible to achieve optimal approximation with the technique disclosed in the above-mentioned publication. However, a high U.C.R.% is adopted in the U.S.A. and European countries. With such a high U.C.R.%, satisfactory resemblance can not be achieved in practice by the technique disclosed in the above-mentioned publication.

Another requirement of an apparatus of this type is ease in preadjustment before operation.

The printing simulation apparatus must be preadjusted in accordance with the printing steps prior to actual simulation. For example, correction factors are adjusted so as to achieve optimal resemblance of an image on the color monitor to the printed image in accordance with the type of printing plate, type of plate making, kind of inks and paper and so on. This preadjustment requires a number of days. The reliability of operation of the printing simulation apparatus depends upon the ease and exactness of preadjustments like this.

SUMMARY OF THE INVENTION

It is an object of the present invention to provide a method and an apparatus for correcting video signals in printing simulation, which allows optimal simulation even if the U.C.R.% is relatively high, and which corrects to remove some value of secondary colors, tertiary colors, quaternary colors, black x primary colors, and black x secondary colors (mixed-colors) respectively on the screen of a color monitor.

It is another object of the present invention to provide a method for correcting video signals in printing simulation, which allows easy and correct preadjustment.

A printing simulation apparatus of the type described above has a converting device which converts signals of printing colors Y, M, C and K into colors B, G and R of the color monitor system.

It is another object of the present invention to provide a method and an apparatus for correcting/ converting video signals in printing simulation, which has a function of color value correction of mixed-colors, and a function of conversion of signals Y, M, C and K to the signals B, G and R.

BRIEF DESCRIPTION OF THE DRAWINGS

The accompanying drawings show preferred embodiments of the present invention, in which.

DETAILED DESCRIPTION OF THE PREFERRED EMBODIMENTS

Figure 1:
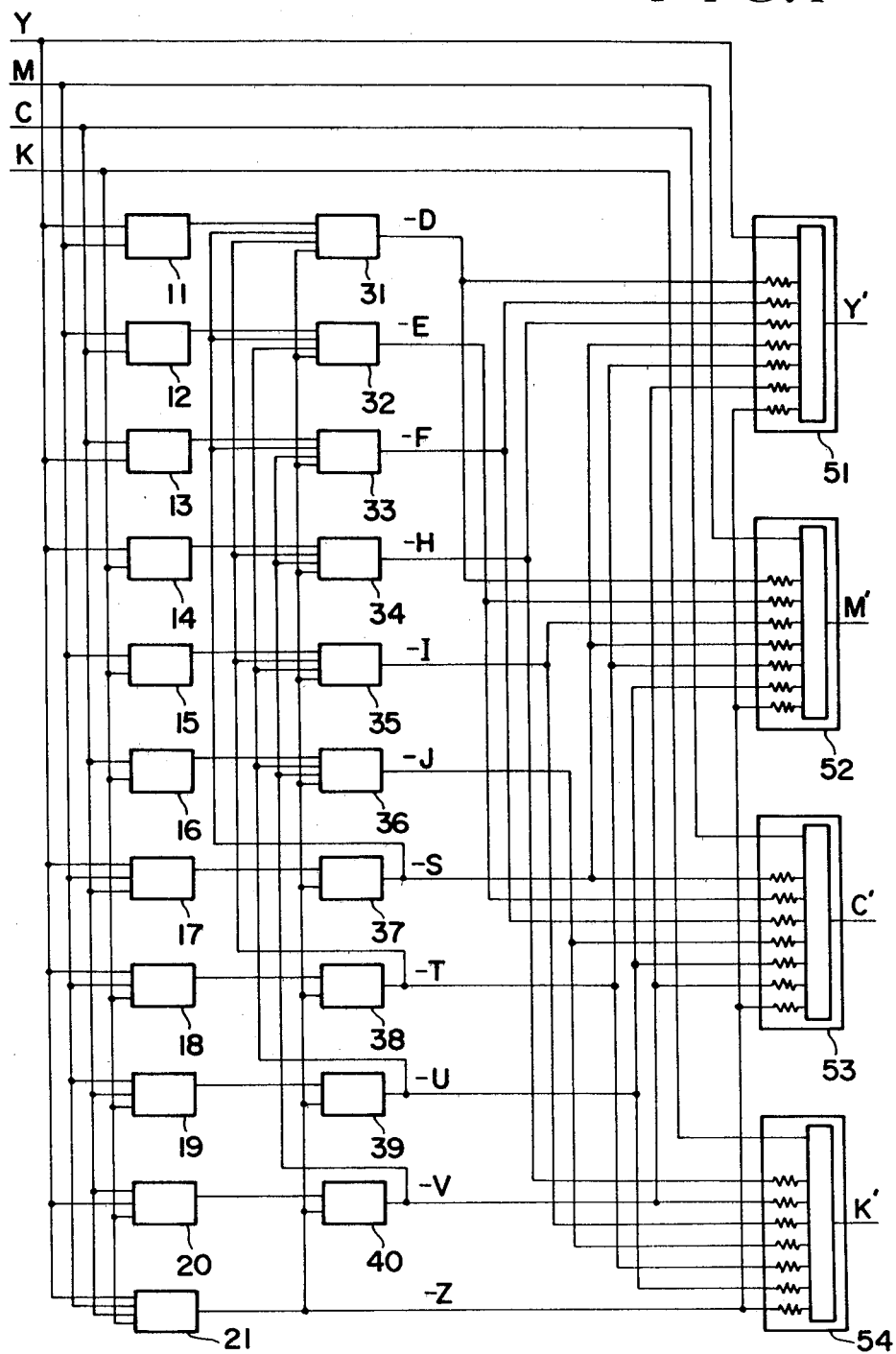
FIG. 1 is a block diagram of a correction apparatus according to an embodiment of the present invention.

Various simulation apparatuses for color printing are known which include an apparatus which receives as input color separation films of yellow Y, magenta M, cyan C and black K and which allows checking of color separation condition of the color separation films; an apparatus which receives a color original as an input original and which determines preferable color separation conditions by masking and reproducing color separation signals obtained from the color original on a color monitor; an apparatus which receives a plurality of color originals as an input original and which determines the color separation conditions as well as the layout of the respective images; an apparatus which is a combination of a simulation apparatus of the type as described above with a color separation apparatus; and so on.

In printing simulation apparatuses of the type as described above, after signals (Y), (M), (C) and (K) for the respective colors Y, M, C and K of a printing system are obtained, these signals are converted into video signals (B) for blue B, (G) for green G and (R) for red R for the color monitor. These signals (B), (G) and (R) are input to the color monitor to reproduce an image resembling the actual printed image. "Conversion" herein indicates conversion of the signals (Y), (M), (C), and (K) of the printing system into the signals (B), (G) and (R) of the color monitor system, unless otherwise specified.

If the signals for colors Y, M, C and K are converted into the signals for colors B, G and R by simple color value calculation, the color value of the image produced on the color monitor is, however, different from that of a printed picture in the portion of mixed-color, thus providing unsatisfactory simulation. In other words, the image on the monitor is represented with a little higher color value in the portion of the mixed-color. Correction for color value of the mixed-color must therefore be made in the process of conversion of the signals for colors Y, M, C and K into the video signals of colors B, G and R. Such a correction may be performed by detecting the signals representing all mixed-colors and by reducing the value of the respective colors with these detected signals.

Since four colors Y, M, C and K are used in the printing process, all the overprinted (mixed) colors are: YxM, MxC, and CxY (to be referred to as secondary colors hereinafter); YxK, MxK, and CxK (to be referred to as black x primary colors); YxMxC (to be referred to as a tertiary color hereinafter); YxMxK, MxCxK, and CxYxK (to be referred to as black x secondary colors hereinafter); and YxMxCxK (to be referred to as a quaternary color hereinafter). Signals corresponding to the above colors are respectively represented as (YxM)=(D), (MxC)=(E), (CxY)=(F), (YxK)=(H), (MxK)=(I), (CxK)=(J), (YxMxC)=(S), (YxMxK)=(T), (MxCxK)=(U), (CxYxK)=(V), and (YxMxCxK)=(Z). In this specification, the above-mentioned colors are defined as mixed-colors.

In order to detect the mixed-color signals as represented above from the original picture color signals (Y), (M), (C) and (K), minimum values (or if inverted signals are processed as the original signals, maximum values are detected as mixed-color signals) of the signals are detected from a plurality of picture color signals involved.

For example, in order to detect the signals of the mixed-color of Y, M and K, signals (Y), (M) and (K) are supplied to a circuit for detecting minimum values thereof, and the minimum or least instantaneous values of the signals (Y), (M) and (K) are detected. In the apparatus of the present invention and in other similar apparatus, original signals are processed in the form of inverted signals. In such a case, as mentioned above, the maximum values of the original signals are detected. The following description will be made with reference to only the inverted signals.

In a description to follow, a signal of the maximum value of a plurality of signals will be represented in the following manner. For example, the maximum signal of the signals (Y), (M) and (K) is represented as (Y·M·K).

Thus, the signals of the mixed-colors as described above may be represented as follows:

(YxM)=(Y·M)=(D)
(MxC)=(M·C)=(E)
(CxY)=(C·Y)=(F)
(YxK)=(Y·K)=(H)
(MxK)=(M·K)=(I)
(CxK)=(C·K)=(J)
(YxMxC)=(Y·M·C)=(S)
(YxMxK)=(Y·M·K)=(T)
(MxCxK)=(M·C·K)=(U)
(CxYxK)=(C·Y·K)=(V)
(YxMxCxK)=(Y·M·C·K)=(Z)

These relations will be referred to hereinafter as the first group of relations.

Of these signals representing colors of a mixed-color, the signal (Y·M) represents the maximum value of a mixed-color, at least yellow Y and magenta M. Therefore, this signal (Y·M) would include YxM, YxMxC, YxMxK and YxMxCxK. If the signal (Y·M) is used for correcting the mixed-color of yellow and magenta and the mixed-colors of YxMxC, YxMxK, and YxMxCxK are corrected, in this case mixed-colors of YxMxC, YxMxK, and YxMxCxK are corrected by the respective mixed-color signals and are further corrected by the signals of (Y·M). In this way, the mixed-colors of YxMxC, YxMxK, and YxMxCxK could be corrected two or three times. From the experiments conducted by the present inventors, overlap corrections are not preferable, Therefore, in order to prevent overlap correction, the signals of the respective mixed-colors as represented below are adopted:

$$(Y \times M) = (\overline{Y \cdot M}) - (Y \times M \times C) - (Y \times M \times K) - (Y \times M \times C \times K) = (D)$$

$$(M \times C) = (\overline{M \cdot C}) - (Y \times M \times C) - (M \times C \times K) - (Y \times M \times C \times K) = (E)$$

$$(C \times Y) = (\overline{C \cdot Y}) - (Y \times M \times C) - (C \times Y \times K) - (Y \times M \times C \times K) = (F)$$

$$(Y \times K) = (\overline{Y \cdot K}) - (Y \times M \times K) - (C \times Y \times K) - (Y \times M \times C \times K) = (H)$$

$$(M \times K) = (\overline{M \cdot K}) - (Y \times M \times K) - (M \times C \times K) - (Y \times M \times C \times K) = (I)$$

$$(C \times K) = (\overline{C \cdot K}) - (M \times C \times K) - (C \times Y \times K) - (Y \times M \times C \times K) = (J)$$

$$(Y \times M \times C) = (\overline{Y \cdot M \cdot C}) - (Y \times M \times C \times K) = (S)$$

$$(Y \times M \times K) = (\overline{Y \cdot M \cdot K}) - (Y \times M \times C \times K) = (T)$$

$$(M \times C \times K) = (\overline{M \cdot C \cdot K}) - (Y \times M \times C \times K) = (U)$$

$$(C \times Y \times K) = (\overline{C \cdot Y \cdot K}) - (Y \times M \times C \times K) = (V)$$

$$(Y \times M \times C \times K) = (\overline{Y \cdot M \cdot C \cdot K}) = (Z)$$

These relations will be referred to hererinafter as the second group of relations.

The relations of this second group can be modified in the following manner to obtain signals of the mixed-colors which have been subjected to overlap compensation:

$$(Y \times M) = (\overline{Y \cdot M}) - (Y \times M \times C) - (Y \times M \times K) - (Y \times M \times C \times K)$$

$$= (\overline{Y \cdot M}) - \{(\overline{Y \cdot M \cdot C}) - (\overline{Y \cdot M \cdot C \cdot K})\} -$$

$$\{(\overline{Y \cdot M \cdot K}) - (\overline{Y \cdot M \cdot C \cdot K})\} - (\overline{Y \cdot M \cdot C \cdot K})$$

$$= \overline{(Y \cdot M)} - \overline{(Y \cdot M \cdot C)} - \overline{(Y \cdot M \cdot K)} + \overline{(Y \cdot M \cdot C \cdot K)}$$

$$= (D)$$

$$(M \times C) = \overline{(M \cdot C)} - (Y \times M \times C) - (M \times C \times K) - (Y \times M \times C \times K)$$

$$= \overline{(M \cdot C)} - \overline{(Y \cdot M \cdot C)} - \overline{(M \cdot C \cdot K)} + \overline{(Y \cdot M \cdot C \cdot K)}$$

$$= (E)$$

$$(C \times Y) = \overline{(C \cdot Y)} - (Y \times M \times C) - (C \times Y \times K) - (Y \times M \times C \times K)$$

$$= \overline{(C \cdot Y)} - \overline{(Y \cdot M \cdot C)} - \overline{(C \cdot Y \cdot K)} + \overline{(Y \cdot M \cdot C \cdot K)}$$

$$= (F)$$

$$(Y \times K) = \overline{(Y \cdot K)} - (Y \times M \times K) - (C \times Y \times K) - (Y \times M \times C \times K)$$

$$= \overline{(Y \cdot K)} - \overline{(Y \cdot M \cdot K)} - \overline{(C \cdot Y \cdot K)} + \overline{(Y \cdot M \cdot C \cdot K)}$$

$$= (H)$$

$$(M \times K) = \overline{(M \cdot K)} - (Y \times M \times K) - (M \times C \times K) - (Y \times M \times C \times K)$$

$$= \overline{(M \cdot K)} - \overline{(Y \cdot M \cdot K)} - \overline{(M \cdot C \cdot K)} + \overline{(Y \cdot M \cdot C \cdot K)}$$

$$= (I)$$

$$(C \times K) = \overline{(C \cdot K)} - (M \times C \times K) - (C \times Y \times K) - (Y \times M \times C \times K)$$

$$= \overline{(C \cdot K)} - \overline{(M \cdot C \cdot K)} - \overline{(C \cdot Y \cdot K)} + \overline{(Y \cdot M \cdot C \cdot K)}$$

$$= (J)$$

$$(Y \times M \times C) = \overline{(Y \cdot M \cdot C)} - (Y \times M \times C \times K)$$

$$= \overline{(Y \cdot M \cdot C)} - \overline{(Y \cdot M \cdot C \cdot K)}$$

$$= (S)$$

$$(Y \times M \times K) = \overline{(Y \cdot M \cdot K)} - \overline{(Y \cdot M \cdot C \cdot K)}$$

$$= (T)$$

$$(M \times C \times K) = \overline{(M \cdot C \cdot K)} - \overline{(Y \cdot M \cdot C \cdot K)}$$

$$= (U)$$

$$(C \times Y \times K) = \overline{(C \cdot Y \cdot K)} - \overline{(Y \cdot M \cdot C \cdot K)}$$

$$= (V)$$

$$(Y \times M \times C \times K) = \overline{(Y \cdot M \cdot C \cdot K)}$$

$$= (Z)$$

These relations will be referred to hereinafter as the third group of relations.

The signals (D), (E), (F), (H), (I), (J), (S), (T), (U), (V) and (Z) of the mixed-colors are thus obtained. In order to correct the signals so that the image on the screen of the color monitor resemble the printed image, colors represented by these signals (D), (E), . . . , (Z) are subtracted in small portions from the colors represented by the original signals (Y), (M), (C) and (K).

More specifically, this may be accomplished by multiplying $-(D)$, $-(E)$, . . . , $-(Z)$ by correction factors and by adding the obtained signals to the corresponding original signals (Y), (M), (C) and (K).

If the corrected signals are represented by (Y)', (M)', (C)' and (K)', they may be represented as follows:

$$(Y)' = (Y) - d_1(D) - f_1(F) - h_1(H) - s_1(S) - t_1(T) - v_1(V) - z_1(Z)$$

$$(M)' = (M) - d_2(D) - e_2(E) - i_2(I) - s_2(S) - t_2(T) -$$

-continued
$$u_2(U) - z_2(Z)$$
$$(C)' = (C) - e_3(E) - f_3(F) - j_3(J) - s_3(S) - u_3(U) -$$
$$v_3(V) - z_3(Z)$$
$$(K)' = (K) - h_4(H) - i_4(I) - j_4(J) - t_4(T) - u_4(U) -$$
$$v_4(V) - z_4(Z)$$

where small letters represent respective correction factors.

These relations will be referred to hereinafter as the fourth group of relations.

In this manner, in order to perform color correction of the mixed-color Y×M, for example, the signal (D) is multiplied by correction factors $d_1$ and $d_2$ so that the same value of the mixed-color may be subtracted from the original signals (Y) and (M) respectively. Similarly, the signal (T) of the mixed-color Y×M×K is corrected so that the same value of the mixed-color may be subtracted from the original signals (Y), (M) and (K). In this manner, the signals (Y)', (M)', (C)' and (K)' for printing which have been subjected to color value correction for the mixed-color may be obtained.

In actual application, the signals (D), (E), ..., (Z) are obtained from the original signals (Y), (M), (C) and (K) according to the relations of the first to third groups (preferably the relations of the second or third group). Then, the signals (Y)', (M)', (C)' and (K)' for printing which have been corrected are obtained from these signals (Y), (M), (C), (K), (D), (E), ..., (Z) according to the relations of the fourth group. These signals (Y)', (M)', (C)' and (K)' are converted into the signals (B), (G) and (R), in a known manner.

A method will now be described for conversion of the original signals into the signals (B), (G) and (R) for the color monitor without obtaining the signals (Y)', (M)', (C)' and (K)' for printing.

Conversion of the signals (Y)', (M)', (C)' and (K)' for printing into the signals (B), (G) and (R) for the color monitor may be performed by the following relations:

$$(B) = y_1(Y)' + m_1(M)' + c_1(C)' + k_1(K)'$$
$$(G) = y_2(Y)' + m_2(M)' + c_2(C)' + k_2(K)'$$
$$(R) = y_3(Y)' + m_3(M)' + c_3(C)' + k_3(K)'$$

where small letters represent the respective correction factors.

These relations will be referred to hereinafter as the fifth group of relations.

Substitution of the relations of the fourth group into the relations of the fifth group provide the signals of blue, green and red as follows:

$$(B) = y_1(Y)' + m_1(M)' + c_1(C)' + k_1(K)'$$
$$= y_1(Y - d_1D - f_1F - h_1H - s_1S - t_1T - v_1V - z_1Z) +$$
$$m_1(M - d_2D - e_2E - i_2I - s_2S - t_2T - u_2U - z_2Z) +$$
$$c_1(C - e_3E - f_3F - j_3J - s_3S - u_3U - v_3V - z_3Z) +$$
$$k_1(K - h_4H - i_4I - j_4J - t_4T - u_4U - v_4V - z_4Z)$$
$$= y_1(Y) + m_1(M) + c_1(C) + k_1(K) -$$
$$(d_1 + d_2)(D) - (e_2 + e_3)(E) - (f_1 + f_3)(F) -$$

-continued
$$(h_1 + h_4)(H) - (i_2 + i_4)(I) - (j_3 + j_4)(J) -$$
$$(s_1 + s_2 + s_3)(S) - (t_1 + t_2 + t_4)(T) -$$
$$(u_2 + u_3 + u_4)(U) - (v_1 + v_3 + v_4)(V) -$$
$$(z_1 + z_2 + z_3 + z_4)(Z)$$

With new correction factors, $$= y_1(Y) + m_1(M) + c_1(C) + k_1(K) - d_5(D) -$$
$$e_5(E) - f_5(F) - h_5(H) - i_5(I) - j_5(J) -$$
$$s_5(S) - t_5(T) - u_5(U) - v_5(V) - z_5(Z)$$

Signals of colors G and R are similarly obtained as:

$$(G) = y_2(Y) + m_2(M) + c_2(C) + k_2(K) -$$
$$d_6(D) - e_6(E) - f_6(F) - h_6(H) - i_6(I) - j_6(J) -$$
$$s_6(S) - t_6(T) - u_6(U) - v_6(V) - z_6(Z)$$
$$(R) = y_3(Y) + m_3(M) + c_3(C) + k_3(K) -$$
$$d_7(D) - e_7(E) - f_7(F) - h_7(H) - i_7(I) - j_7(J) -$$
$$s_7(S) - t_7(T) - u_7(U) - v_7(V) - z_7(Z)$$

These relations will be referred to hereinafter as the relations of the sixth group.

Figure 4:
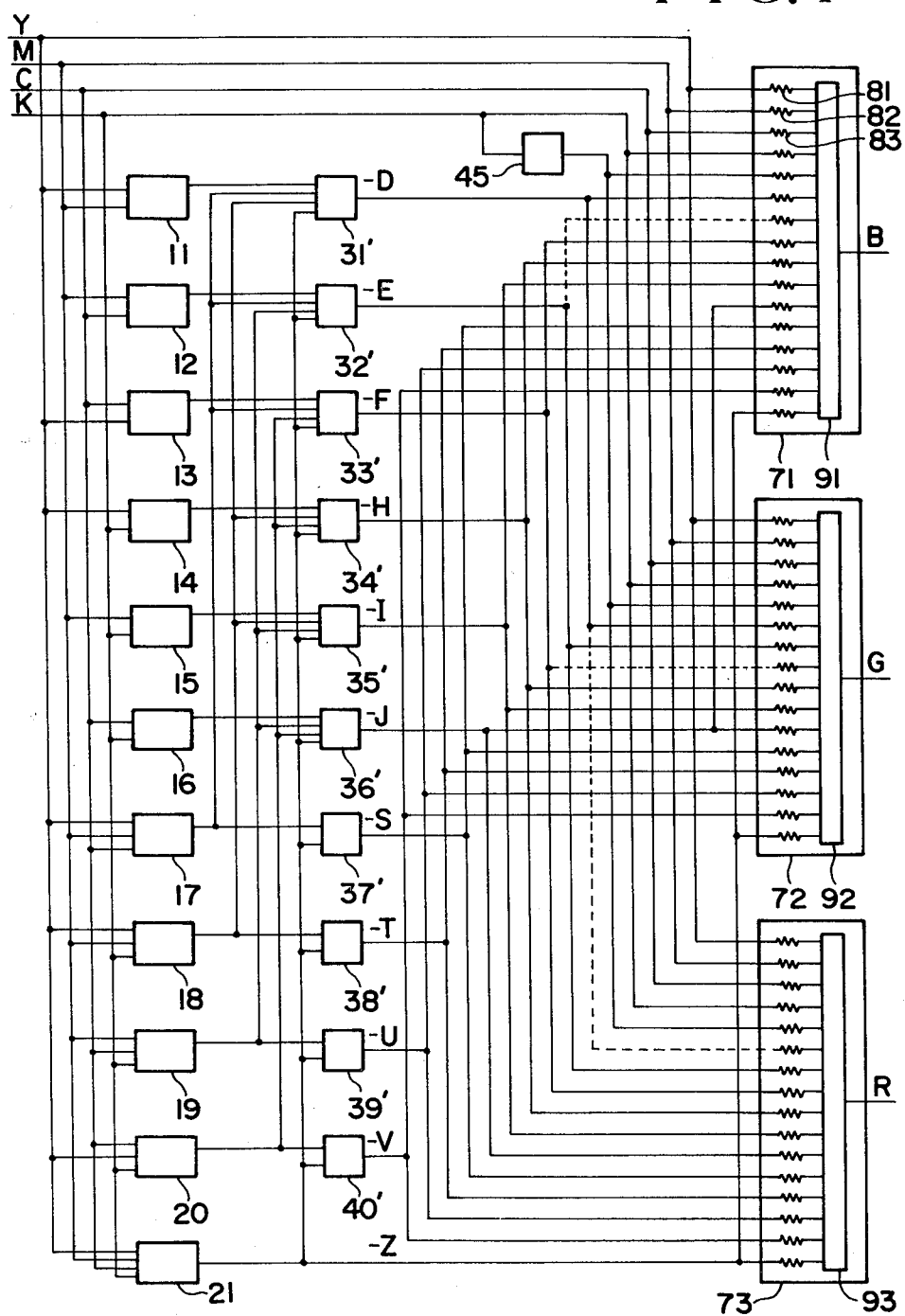
FIG. 4 is a block diagram of a correction/conversion apparatus according to still another embodiment of the present invention.
Figure 4:
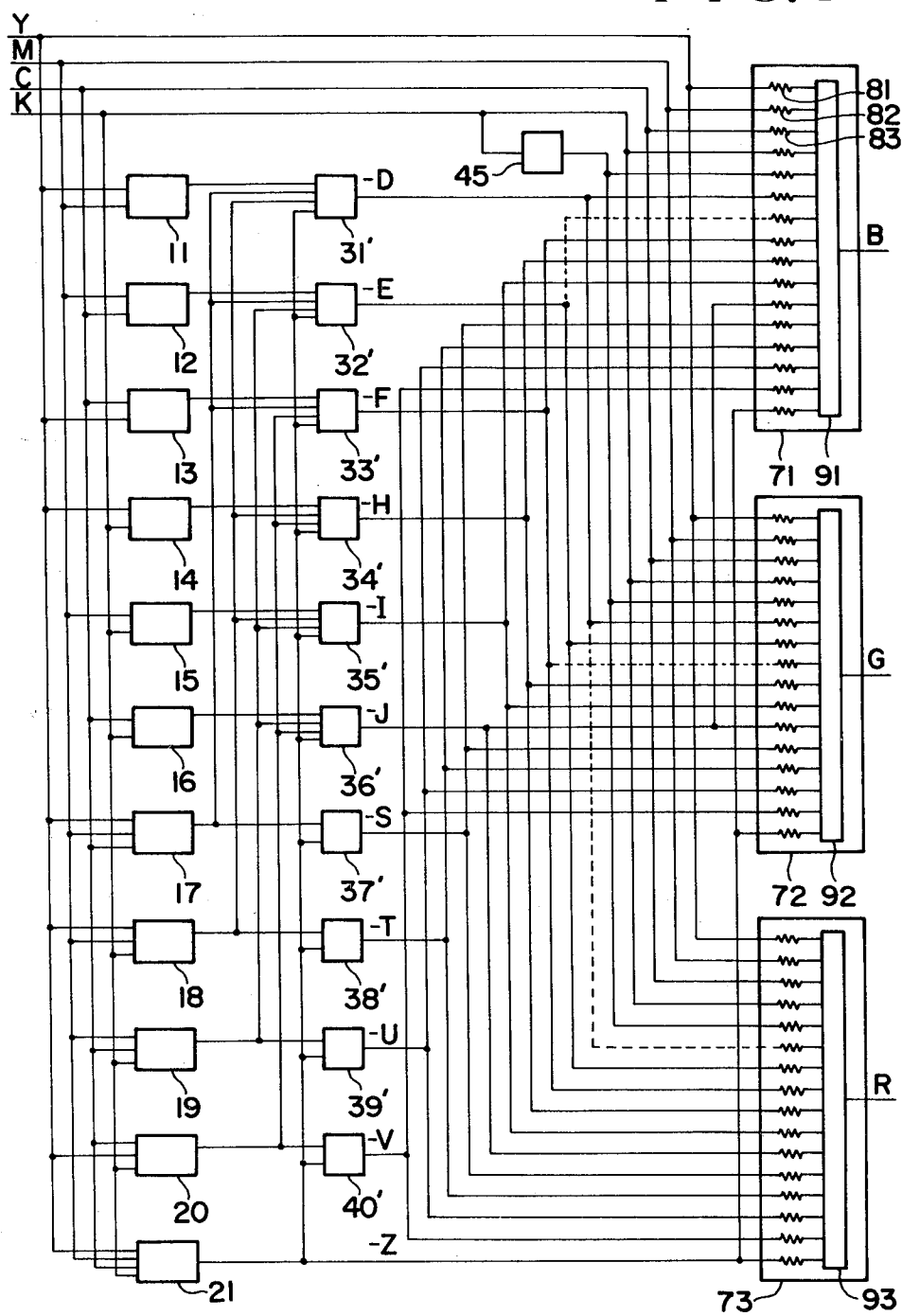

In the relations of the sixth group as represented above, $-e_3(E)$ for obtaining the signal (B), $-e_6(E)$ for obtaining the signal (G) and $-d_7(D)$ for obtaining the signal (R) may be omitted since they are not closely related to control of color value (refer to dotted lines in FIG. 4).

As for black K, in the case of high U.C.R.%, although the signal of the mixed-color of K with another color is subtracted in a small portion, but the signal (K) is in a greater amount at high U.C.R.%. Therefore, black K on the color monitor tends to be too dark. In order to solve this problem, in the circuit of the embodiment of the present invention, the signal (K) is supplied to an inverter 45 to obtain a signal $-(K)$ which is input to correction/conversion circuits 71, 72 and 73 for the respective colors. The correction/conversion circuits 71, 72 and 73 multiply the input signal $-(K)$ by correction factors and supply the obtained signals to adders 91, 92 and 93 through resistors (refer to FIGS. 3 and 4).

The signals (B), (G) and (R) of the color monitor may be directly obtained from the uncorrected signals (Y), (M), (C) and (K) without obtaining the signals (Y)', (M)', (C)' and (K)'. This may be accomplished by obtaining the signals (D), (E), ..., (Z) from the signals (Y), (M), (C) and (K), and by substituting the signals (Y), (M), (C), (D), (E), ..., (Z) in the relations of the sixth group.

The present invention will now be described by way of its examples with reference to a correction apparatus according to an embodiment of the present invention. FIG. 1 shows a block diagram of the correction apparatus. The correction apparatus shown in FIG. 1 embodies the relations of the second and fourth groups.

Referring to FIG. 1, the input signals (Y), (M), (C) and (K) are inverted signals representing color value of colors Y, M, C and K (e.g., a signal of 100% value at 0 V P—P and 0% value at 0.7 V P—P for a 0.7 V P—P signal). These signals (Y), (M), (C) and (K) are supplied to corresponding secondary color detectors 11, 12, 13; black x primary color detectors 14, 15 and 16; a tertiary color detector 17; black x secondary color detectors 18, 19 and 20; and a quaternary color detector 21.

These mixed-color detectors 11 to 21, respectively, comprise combined maximum value detectors and inverters. Specifically, these detectors detect the signal of the highest level among a plurality of input signals respectively supplied to the input ends thereof, and invert and output the detected signals to their output ends.

In order to prevent plural overlap corrections, these signals are then supplied to overlap compensation circuits 31 to 40. These overlap compensation circuits 31 to 40 perform inversion, addition and subtraction of the input signals. For example, separately obtained signals $-(Y \times M \times C)$, $-(Y \times M \times K)$ and $-(Y \times M \times C \times K)$ are removed by inversion and addition at the circuit 31 from the signal $-(Y \cdot M)$ obtained at the circuit 11, in accordance with the relations of the second group.

The signals $-(D)$ to $-(Z)$ of the mixed-colors which have been subjected to overlap compensation are then input to corresponding color correction circuits 51 to 54. For example, the signal $-(D)$ representing mixed-color of Y and M is input to the circuit 51 associated with Y and to the circuit 52 associated with M.

At the color correction circuits 51 to 54, the input signals $-(D)$ to $-(Z)$ are multiplied by correction factors (d, e, ..., z in the relations of the fourth group) by the resistors and are thereafter added to the original signals (Y), (M), (C), and (K).

Since the original signals (Y), (M), (C) and (K) are inverted signals and the signals $-(D)$, $-(E)$, ..., $-(Z)$ are not inverted, multiplication of the signals $-(D)$, $-(E)$, ..., $-(Z)$ by the correction factors d, e, ..., z and addition of the obtained signals to the original signals (Y), (M), (C) and (K) result in reduction (removal) in small portions of the value of the mixed-colors.

In this manner, the circuits 51 to 54 perform the calculation of relations of the fourth group and provide the signals (Y)', (M)', (C)' and (K)' for corrected secondary colors, tertiary color, black x primary colors, black x secondary colors, and quaternary color.

Figure 2:
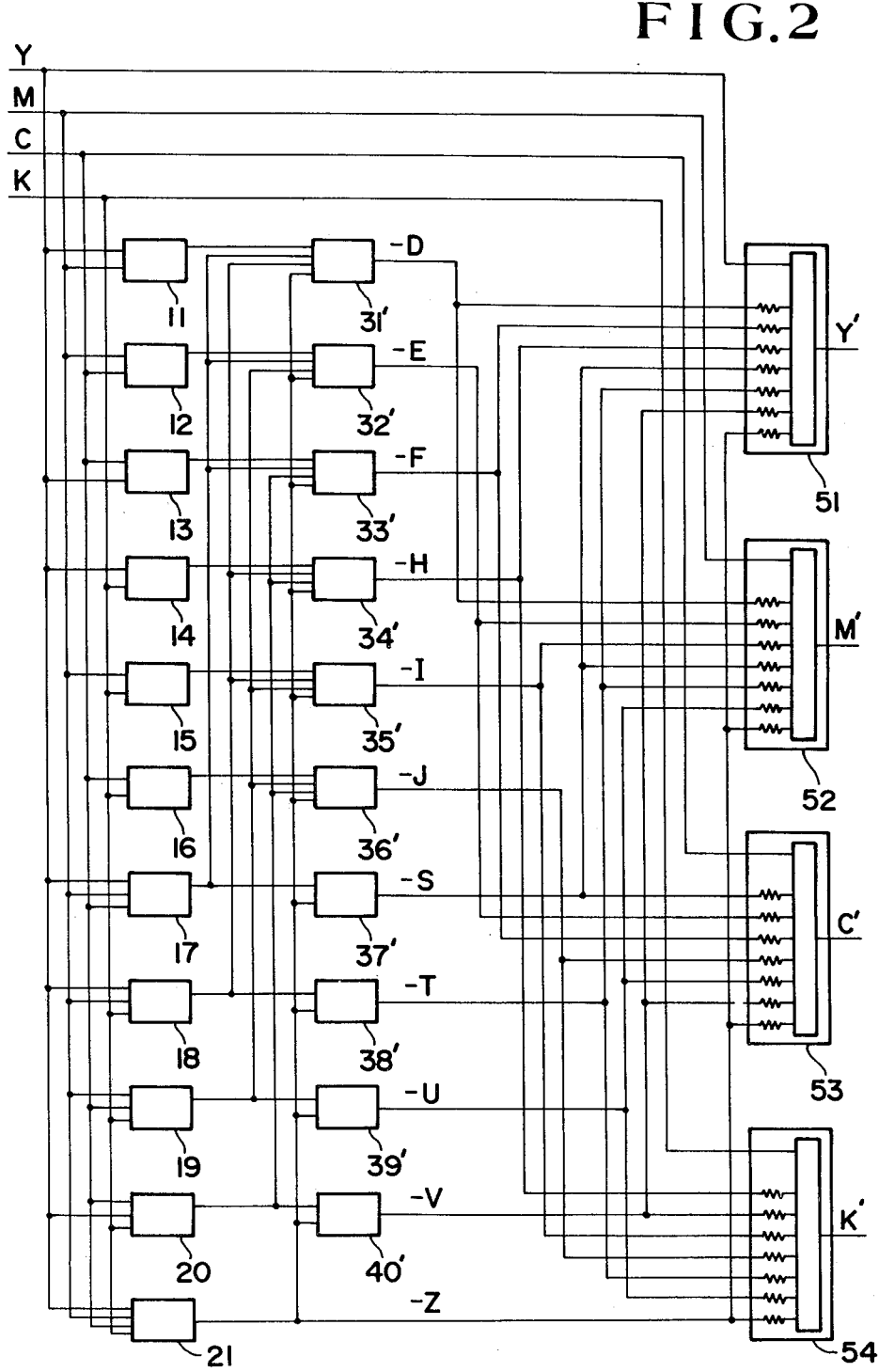
FIG. 2 is a block diagram of a correction apparatus according to another embodiment of the present invention.

FIG. 2 shows another embodiment of the present invention.

This embodiment is based on the relations of the third group for overlap-compensation. Therefore, the arrangement for obtaining the signals $-(D)$, $-(E)$, ..., $-(Z)$ is different from that of the embodiment shown in FIG. 1. For example, at the circuit 31, the signals (Y·M) and (Y·M·C·K) are added while the signals (Y·M·C) and (Y·M·K) are subtracted. The rest of the arrangement remains the same as that of the embodiment shown in FIG. 1 for the configuration for obtaining the inverted mixed-color signals $-(Y \cdot M)$, $-(M \cdot C)$, ..., $-(Y \cdot M \cdot C \cdot K)$ from the signals (Y), (M), (C) and (K) and the configuration for obtaining the corrected signals (Y)', (M)', (C)', and (K)' from the signals (Y), (M), (C), (K), $-(D)$, $-(E)$, ..., $-(Z)$.

Figure 3:
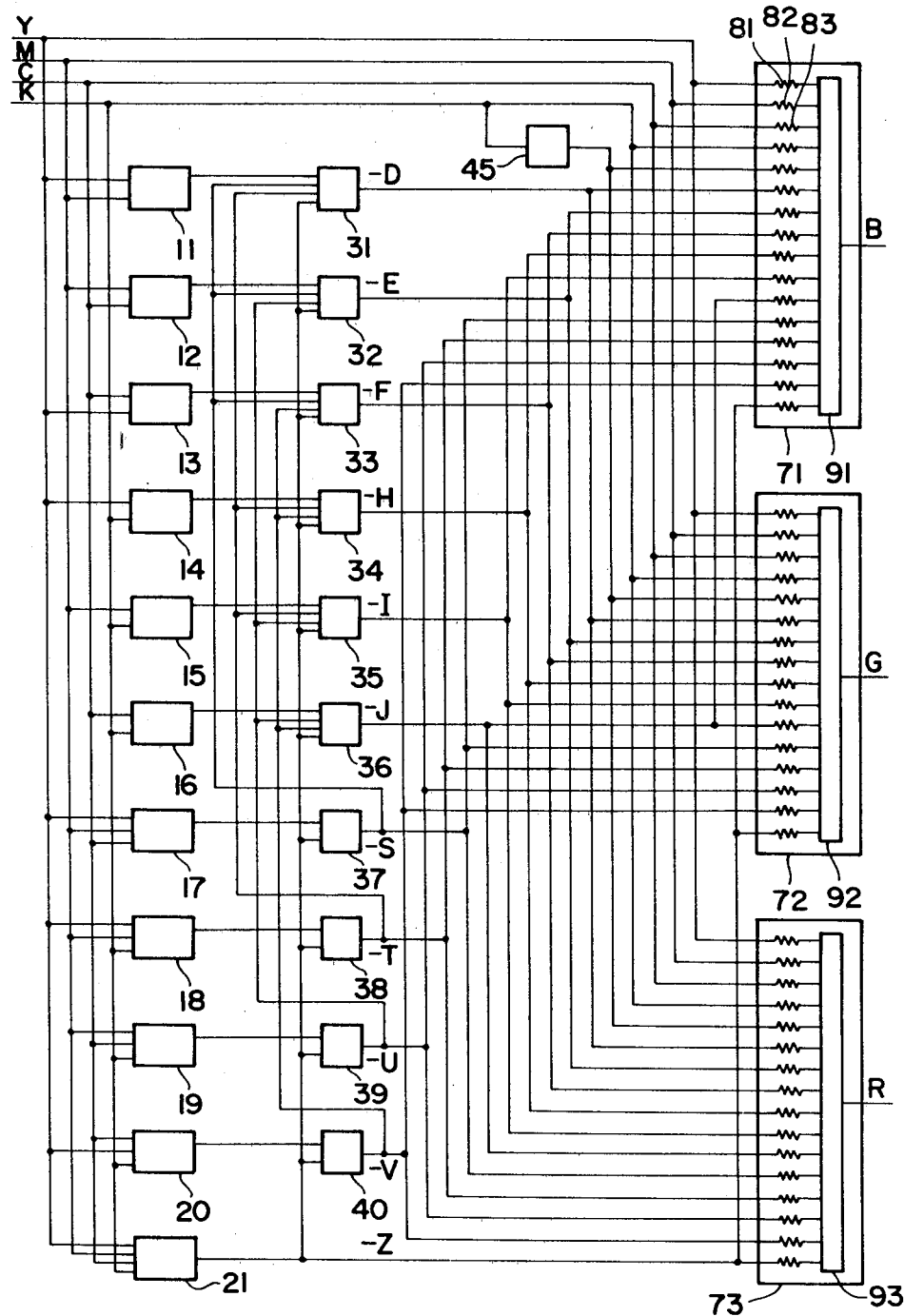
FIG. 3 is a block diagram of a correction/conversion apparatus according to still another embodiment of the present invention.

The embodiments of the correction apparatus have been described so far. A description will now be made on embodiments of correction/conversion apparatus. FIG. 3 shows a block diagram of a correction/conversion apparatus according to an embodiment of the present invention. The arrangement up to the process of obtaining the signals $-(D)$, $-(E)$, ..., $-(Z)$ remains the same as that in the embodiment shown in FIG. 1. The signal (K) is inverted by the inverter 45 to provide the signal $-(K)$ as has been described above.

The signals (D), (E), (F), (H), (I), (J), (S), (T), (U), (V) and (Z) which have been overlap-compensated and have been inverted and the input original signals (Y), (M), (C), (K), and $-(K)$ are supplied to correction/conversion circuits 71 to 73.

These correction/conversion circuits 71 to 73 perform calculation of the relations of the sixth group (e.g., the correction for mixed-colors of inks, and conversion of the signals of the inks to signals for the color monitor). The correction/conversion circuits 71 to 73 thus obtain the three primary signals (B), (G) and (R) for the color monitor.

Resistors 81, 82 and so on in the correction/conversion circuits 71 to 73 are variable resistors which determine correction factors of the relations of the sixth group: $y_1$, $m_1$, $c_1$, $k_1$, $(k'_1)$, $d_5$, $e_5$, $f_5$, $h_5$, $i_5$, ..., $s_7$, $t_7$, $u_7$, $v_7$ and $z_7$. The input signals are supplied to adders 91, 92 and 93 through these resistors and the signals (B), (G) and (R) are obtained according to the relations of the sixth group. FIG. 4 shows a correction/conversion apparatus according to another embodiment of the present invention.

In this embodiment, the configuration for obtaining the signals $-(D)$, $-(E)$, ..., $-(Z)$ for the mixed-colors which have been overlap-compensated is the same as that of the embodiment shown in FIG. 2. Further, the configuration for obtaining the signals (B), (G) and (R) which are corrected in value of the mixed-colors is also the same as that of the embodiment shown in FIG. 3. Therefore, they will not be described. With the correction/conversion apparatuses of the embodiments shown in FIGS. 3 and 4, the signals (B), (G) and (R) for the color monitor may be directly obtained without obtaining the signals (Y)', (M)', (C)' and (K)'.

The correction/conversion apparatus of the embodiment will be described with reference to the block diagram shown in FIG. 3.

Each of the input signals (Y), (M), (C) and (K) is a signal corresponding to no ink in at 100% and solid ink at 0% level and is a signal clamped to a certain dc voltage at 0% level. These signals are input to the secondary color detectors 11, 12 and 13; the black x primary color detectors 14, 15 and 16; the tertiary color detector 17; the black x secondary color detectors 18, 19 and 20; and the quaternary color detector 21.

These detectors 11 to 21 will be described taking the quaternary detector 21 shown in FIG. 5 as an example.

Figure 5:
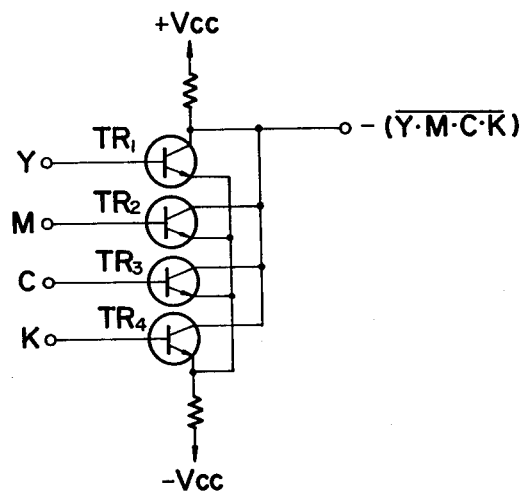
FIGS. 5 to 7 are circuit diagrams of the apparatus shown in FIG. 3.

Referring to FIG. 5, transistors TR1 to TR4 constitute an NAM (Non-Additive Mixing) circuit. Of the base inputs of the respective transistors, dc voltage signals of high level alone can be passed through the transistor. Therefore, the signals (Y), (M), (C) and (K) of the common part alone may be obtained at the output ends of the transistors TR1 to TR4. The inverted signals of the common part signals may be obtained by obtaining the output signals from the collectors of the transistors. In the case of the tertiary color detection, since the number of color signals represented is smaller by one, three transistors are used. For the same reason, two transistors are used for detection of the secondary colors.

The signals of the mixed-colors thus obtained are supplied to the overlap compensation circuits 31 to 40 at the next stage shown in FIG. 3. The process of obtaining the signal $-(D)$ which is overlap-compensated from the signal $-(Y \cdot M)$ will be described with reference to the circuit diagram shown in FIG. 6.

Figure 6:
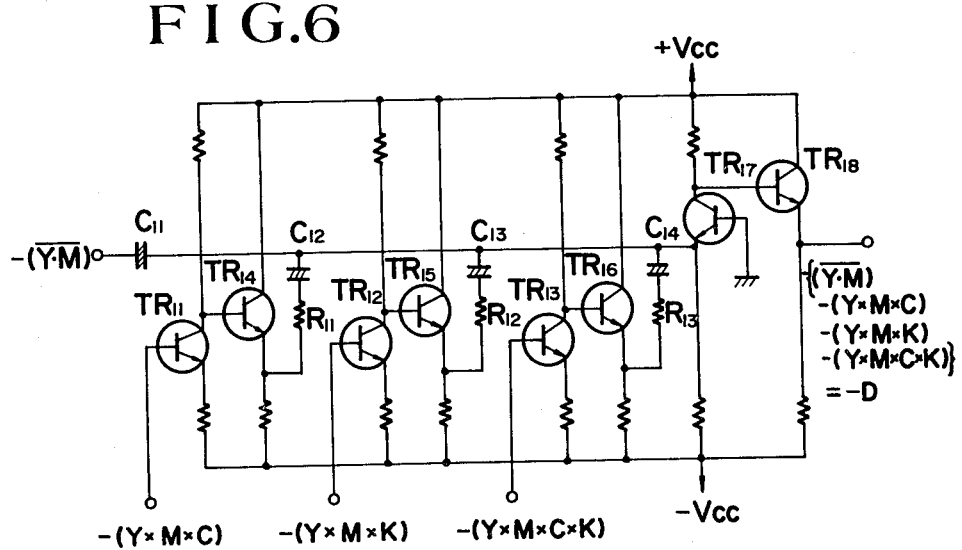

Referring to FIG. 6, transistors TR11 to TR13 are inverters which respectively receive, at bases thereof, the signal −(YxMxC) obtained at the overlap compensation circuit 37, the signal −(YxMxK) obtained at the overlap compensation circuit 38, and the signal −(YxMxCxK) obtained at the detector 21, shown in FIG. 3. The inverted input signals may be obtained from the collectors of these transistors TR11 to TR13. Meanwhile, the input signal −(Y·M) which is not overlap-compensated is input to the emitter of a transistor TR17 through a capacitor C11. The transistor TR17 is a base-grounded circuit. To the emitter of the transistor TR17 are further input the signal +(YxMxC) through a resistor R11 and a capacitor C12, the signal +(YxMxK) through a resistor R12 and a capacitor C13, and the signal +(YxMxCxK) through a resistor R13 and a capacitor C14. The signal of the sum of all these input signals and of the same polarity as that of the input signals is supplied to the collector of the transistor TR17. The resistances of the resistors R11, R12 and R13 are determined so that the signals (YxMxC), (YxMxK) and (YxMxCxK) become zero at the output end of the transistor TR17. Therefore, the overlap-compensated signal −(D) is obtained which is equal to $-(YxM) = -(Y \cdot M) + (YxMxC) + (YxMxK) + (YxMxCxK)$. Transistors TR14 to TR16 and TR18 respectively serve as buffers. The overlap compensation circuits 37 to 40 shown in FIG. 3 need only perform overlap compensation of one color as seen from the relations of the second group for the signals (S), (T), (U) and (V). Therefore, only one inverter is included for each of the overlap compensation circuits 37 to 40. Since the inverter 45 for the signal (K) is the same as that consisting of the inverting transistors TR11 to TR13 shown in FIG. 6, a description of it will be omitted.

The signals −(D), −(E), −(F), −(H), −(I), −(J), −(S), −(T), −(U), −(V), −(Z) and −(K) are supplied to the correction/conversion circuits together with the original signals (Y), (M), (C) and (K).

The correction/conversion circuit 71 shown in FIG. 3 will be described with reference to the circuit diagram shown in FIG. 7.

Figure 7:
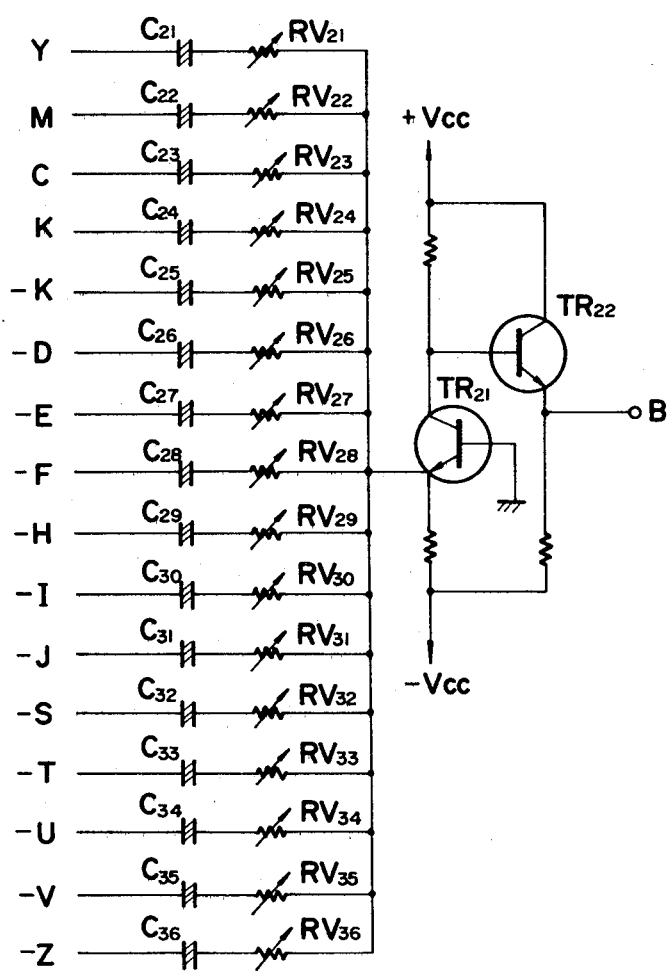

Referring to FIG. 7, input signals are applied to the emitter of a transistor TR21 through capacitors C21 to C36 according to the proportions determined by variable resistors RV21 to RV36. The transistor TR21 is a base-grounded circuit. An addition signal of the same polarity to that of the input signals is obtained from the collector thereof. Since the respective primary colors of (Y), (M), (C) and (K) are of positive polarity and the other signals are of negative polarity, the transistor TR21 operates so that the values are reduced in small portions by the respective signals of negative polarity representive of the secondary colors, the tertiary color, the quaternary color, black x primary colors and black x secondary colors which are obtained as mixed-colors of primary colors. Since these signals of negative polarity have been subjected to overlap compensation, only desired colors may be varied in value by varying the resistances of the corresponding variable resistors, so that control is extremely easy. A transistor TR22 performs the impedance conversion and produces an output signal from the emitter thereof.

With the apparatus of the present invention, the following advantages are obtained.

Even in a printing processed with a relatively high U.C.R.%, an image of the color monitor may be made to sufficiently resemble the printed image.

By adoption of the mixed-color signals which is overlap-compensated in the simulation process, color value of the respective colors of a mixed-color may not be excessively corrected.

By performing the conversion of the signals into the signals (B), (G) and (R) during the process of the mixed-color correction, the construction of the apparatus may be made simpler and reliability of signal processing may be improved and preadjustment becomes easier. Especially, each color may be corrected and easily adjusted by first adjusting the primary colors with compensation factors.

What is claimed is:

1. A method for correcting video signals applied to a color monitor which is used to present a simulation of a printed image which printed image is derived from signals (Y), (M), (C) and (K) for yellow Y, magenta M, cyan C and black K, respectively, said process comprising the steps of:
   detecting mixed-color signals of secondary colors, a tertiary color, black x primary colors, black x secondary colors, and a quaternary color from the signals (Y), (M), (C) and (K);
   multiplying the mixed-color signals of secondary colors, the tertiary color, the black x primary colors, the black x secondary colors, and the quaternary color by correction factors; and
   subtracting the obtained signals from the signals (Y), (M), (C) and (K) so as to form an image on the color monitor in accordance with subtraction signals, so that color value of mixed-colors may be reduced in small portions.

2. A method for obtaining signals (B), (G) and (R) for blue, green and red, respectively, which signals are applied to a color monitor for forming an image on the color monitor which image resembles a printed image which is formed from signals (Y), (M), (C) and (K) for yellow Y, magenta M, cyan C and black K, respectively, said method comprising the steps of:
   detecting either the maximum or minimum values of the signals (Y), (M), (C) and (K) to provide mixed-color signals (YxM), (MxC), (CxY), (YxK), (MxK), (CxK), (YxMxC), (YxMxK), (MxCxK), (CxYxK), and (YxMxCxK):
   subtracting overlap signals from the mixed-color signals for elimination of overlap correction of mixed-color signals to obtain overlap-compensated signals (D), (E), (F), (H), (I), (J), (S), (T), (U), (V) and (Z);
   multiplying the overlap-compensated signals by correction factors; and
   subtracting the obtained signals from the signals (Y), (M), (C) and (K) so that color value of mixed-colors may be reduced.

3. A method for obtaining signals (B), (G) and (R) for blue, green and red, respectively, which signals are applied to a color monitor for forming an image on the color monitor resembling a printed image which is formed from signals (Y), (M), (C) and (K) for yellow Y, magenta M, cyan C and black K, respectively, said method comprising the steps of:
   obtaining mixed-color signals from the signals (Y), (M), (C) and (K);
   performing overlap compensation with the mixed-color signals to obtain overlap-compensated signals of secondary colors, a tertiary color, black x primary colors, black x secondary colors, and a quaternary color;

multiplying the signals (Y), (M), (C) and (K) by correction factors and adding the obtained signals to convert the signals (Y), (M), (C) and (K) into the signals (B), (G) and (R); and in parallel with the conversion, multiplying the overlap-compensated signals with correction factors and reducing so that color value of the mixed-color may be reduced in small portion.

4. A method according to claim 3, wherein a signal −(K) is obtained from the signal (K), the signal −(K) is multiplied by a correction factor, and a color value of a color of the signal (K) is reduced in a small portion.

5. An apparatus for correcting video signals used for forming an image on a color monitor which image resembles a printed image formed from signals (Y), (M), (C) and (K) for yellow Y, magenta M, cyan C and black K, respectively, said apparatus comprising:

secondary and tertiary color detectors including a Non-Additive Mixing circuit for detecting secondary and teritiary colors from the original signals;

detectors for detecting black x primary colors and black x secondary colors;

a quaternary color detector for detecting a quaternary color; and a color correction circuit which subtracts in small portions signals of secondary colors, the tertiary color, the black x primary colors, the black x secondary colors and the quaternary color from the signals (Y), (M), (C) and (K).

6. An apparatus for correcting video signals used for forming an image in blue, green and red on a color monitor which image resembles a printed image which is formed from signals (Y), (M), (C) and (K) for yellow Y, magenta M, cyan C and black K, respectively, said apparatus comprising:

detectors for detecting mixed-color signals (YxM), (MxC), (CxY), (YxK), (MxK), (CxK), (YxMxC), (YxMxK), (MxCxK), (CxYxK) and (YxMxCxK) from the signals (Y), (M), (C) and (K);

an overlap compensation circuit for preventing an overlap correction of the mixed-color signals; and a color correction circuit which multiples overlap-compensated mixed-color signals by correction factors so that color value of mixed-colors may be reduced from the signals (Y), (M), (C) and (K).

7. An apparatus for obtaining signals (B), (G) and (R) for blue, green and red, respectively, for forming an image on a color monitor which image resembles a printed image formed from signals (Y), (M), (C) and (K) for yellow Y, magneta M, cyan C and black K, respectively, said apparatus comprising:

detectors for detecting mixed-color signals of secondary colors, a tertiary color, black x primary colors, black x secondary colors and a quaternary color;

an overlap compensation circuit for performing overlap compensation of the mixed-color signals; and a correction/conversion circuit which calculates the signals (B), (G) and (R) from the signals (Y), (M), (C) and (K) and the overlap-compensated mixed-color signals;

said correction/conversion circuit multiplying the signals (Y), (M), (C) and (K) and the overlap-compensated mixed-color signals by correction factors, and adding and subtracting the obtained signals, thereby converting the signals (Y), (M), (C) and (K) into the signals (B), (G) and (R).

8. An apparatus according to claim 7, further comprising an inverter for obtaining a signal −(K) from the signal (K), the signal −(K) being multiplied by the correction factor at said correction/conversion circuit so that black may be reduced in a small portion.

* * * * *